United States Patent [19]

Kajikawa et al.

[11] 4,362,504
[45] Dec. 7, 1982

[54] APPARATUS FOR MANUFACTURING A RAPIDLY COOLED SOLIDIFIED GAS HAVING ROTATING COOLING DRUM

[75] Inventors: Shuji Kajikawa; Kazuo Kanai; Haruo Ito; Yoshihisa Hirata; Jiro Konishi; Yasuto Takasaki; Kenji Ohkoshi; Yoshinobu Yanagida, all of Fukuyama, Japan

[73] Assignee: Nippon Kokan Kabushiki Kaisha, Tokyo, Japan

[21] Appl. No.: 266,819

[22] Filed: May 26, 1981

[30] Foreign Application Priority Data

Jun. 11, 1980 [JP] Japan ................... 55-77864
Jun. 11, 1980 [JP] Japan ................... 55-77865

[51] Int. Cl.³ .............................................. F27D 15/02
[52] U.S. Cl. ................................... 432/83; 110/165 R; 266/201; 432/90
[58] Field of Search .................. 432/77, 83, 70, 90, 432/91; 110/165 R; 266/201

[56] References Cited

U.S. PATENT DOCUMENTS

| | | | |
|---|---|---|---|
| 1,945,253 | 2/1934 | Ellis | 110/165 R |
| 1,988,473 | 1/1935 | Bennett | 110/165 R |
| 2,013,680 | 9/1935 | Bennett | 110/165 R |
| 2,693,775 | 11/1954 | Berry | 110/165 R |
| 4,050,884 | 9/1977 | Jablin | 432/29 |
| 4,330,264 | 5/1982 | Konishi et al. | 432/77 |

FOREIGN PATENT DOCUMENTS

| | | |
|---|---|---|
| 427772 | 4/1926 | Fed. Rep. of Germany . |
| 325576 | 1/1903 | France . |
| 2406377 | 5/1979 | France . |
| 52-78694 | 7/1977 | Japan . |
| 440997 | 1/1936 | United Kingdom . |

OTHER PUBLICATIONS

Patents Abstracts of Japan, vol. 1, WO120, Oct. 12, 1977, p. 2744C77.

*Primary Examiner*—John J. Camby
*Attorney, Agent, or Firm*—Frishauf, Holtz, Goodman and Woodward

[57] ABSTRACT

An apparatus for manufacturing a rapidly cooled solidified slag, which comprises: at least one rotating cooling drum rotating around a horizontal center axis thereof, said cooling drum being cooled by a cooling medium, and having an outer peripheral surface comprising a plurality of jogs over the entire surface thereof; a slag sump arranged at a position where said peripheral surface of said cooling drum begins to rise, the depositing molten slag onto said peripheral surface of said cooling drum; a scraper proved at the lower part of said peripheral surface of said cooling drum; and a slag feeding means arranged above said cooling drum, for pouring said molten slag into said slag sump; whereby said molten slag poured into said slag sump is deposited onto said peripheral surface of said cooling drum, rapidly cooled through heat exchange with said cooling medium along with rotation of said cooling drum to become a solidified slag, and peeled off from said peripheral surface of said cooling drum by said scraper.

7 Claims, 11 Drawing Figures

APPARATUS FOR MANUFACTURING A RAPIDLY COOLED SOLIDIFIED GAS HAVING ROTATING COOLING DRUM

FIELD OF THE INVENTION

The present invention relates to an apparatus for manufacturing a rapidly cooled solidified slag, having at least a rotating cooling drum, which permits stable and continuous manufacture of the rapidly cooled solidified slag.

BACKGROUND OF THE INVENTION

Molten slags include, for example, molten blast furnace slag, molten converter slag, and molten electric furnace slag. It has been already known that it is possible to obtain a vitreous slag, for example, by cooling a molten blast furnace slag at a high cooling rate and thereby solidifying the same. The vitreous slag thus obtained is suitable, for example, as a cement material.

FIG. 1 illustrates a prior art apparatus for manufacturing rapidly cooled solidified slag, which is substantially the same as the apparatus for manufacturing a rapidly cooled solidified slag disclosed in U.S. Pat. No. 4,050,884 dated Sept. 27, 1977. In FIG. 1, 1 is an enclosed-structure housing. The housing 1 has an opening 1a at the top thereof for passing molten slag, and a discharge port 1b at the lower end thereof for discharging a rapidly cooled solidified slag having been crushed. In the housing 1, a pair of cooling drums 2 having the same diameter and the same length are arranged so that the axial directions thereof are parallel to each other in the same horizontal plane and the peripheral surfaces thereof are in contact with each other. Each of the pair of cooling drums 2 is rotated by a suitable driving means (not shown) in directions opposite to each other at the same peripheral speed as shown by the arrows "a" and "a'" in FIG. 1, in the rising direction of the peripheral surfaces thereof at the contact portion of the pair of cooling drums 2. A plurality of cooling through-holes (not shown) are pierced in the peripheral wall of each of the pair of cooling drums 2 in the longitudinal axial direction thereof. One end of each of the plurality of cooling through-holes communicates with the interior of a hollow portion (not shown) of one end of the center axle of the cooling drum, and the other end of each of the cooling through-hole communicates with the interior of a hollow portion (not shown) of the other end of the center axle of the cooling drum. The hollow portion (not shown) of the one end of the center axle of the cooling drum 2 is liquid-tightly connected to one end of a pipe 3 through a swivel joint (not shown). The other end of the pipe 3 is connected to the inlet of a steam drum 4. An end of another pipe 6 provided with a pump 5 is connected to the hot water outlet of the steam drum 4. In FIG. 1, 4a is an air feed valve of the steam drum 4 and 4b is a water supply valve of the steam drum 4. The other end of the pipe 6 is liquid-tightly connected to the hollow portion (not shown) of the other end of the center axle of the cooling drum 2 through another swivel joint (not shown). In FIG. 1, the steam drum 4 is connected to one of the cooling drums 2, and another steam drum (not shown) is similarly connected to the other cooling drum 2. As a result, by means of the pump 5, the cooling water for cooling the cooling drum 2 is supplied to the plurality of cooling through-holes of the periphery of the cooling drum 2 through the pipe 6 and the axle of the cooling drum 2. The cooling water supplied to the plurality of cooling through-holes is heated by the heat contained in the molten slag 7 deposited onto the peripheral surface of the cooling drum 2 as described later, and supplied to the steam drum 4 through the axle of the cooling drum 2 and the pipe 3 while partially generating steam. The pressurized steam supplied to the steam drum 4 is separated into steam and hot water in the steam drum 4. The hot water separated in the steam drum 4 is supplied again, as the cooling water, to the plurality of cooling through-holes of the peripheral wall of the cooling drum 2 through the pipe 6 by means of the pump 5. As a result, the cooling water circulates through the cooling drum 2 and the steam drum 4. The steam separated in the steam drum 4 is, on the other hand, used for driving, for example, a turbine (not shown).

A pair of weirs 8 are provided in the upper halves of the both ends of the pair of cooling drums 2 so as to be in contact with the both ends of the pair of cooling drums 2 (FIG. 1 shows only one of the pair of weirs 8). The top ends of the pair of weirs 8 are connected with each other through a cover 8' having at the center thereof an opening 8'a. The pair of weirs 8 and the cover 8' are supported on the housing 1 by means of a suitable supporting means (not shown). A slag sump 9 is formed by the bodies of the pair of cooling drums 2 and the pair of weirs 8. The molten slag 7 discharged from a slag runner 10 is poured into the slag sump 9 through the opening 1a of the housing 1 and the opening 8'a of the cover 8', where a slag pool is formed. The molten slag 7 poured into the slag sump 9 is deposited onto the peripheral surfaces of the cooling drums 2 during the rotation thereof, rapidly cooled and solidified substantially completely into a solidified slag. The cooling water supplied to the plurality of cooling through-holes of the peripheral wall of the cooling drum 2 is heated by the molten slag 7 deposited onto the peripheral surfaces of the cooling drums 2 and becomes hot water having pressurized steam. When the solidified slag 7' on the peripheral surfaces of the cooling drums 2 reaches the lower halves of the cooling drums 2 according to the rotation of the cooling drums 2, the rapidly cooled solidified slag 7' deposited onto the peripheral surfaces of the cooling drums 2 is peeled off therefrom, while being crushed by a scraper 11 supported on the housing 1 by means of a suitable supporting means (not shown), and drops into the lower part of the housing 1. A suitable opening and closing means (not shown) is provided in the discharge port 1a of the lower part of the housing 1. The peripheral surfaces of the cooling drums 2 from which the rapidly cooled solidified slag 7' has been peeled off by the scraper 11 comes again into contact with the molten slag 7 of the slag sump 9 according to the rotation of the cooling drums 2, whereby the rapidly cooled solidified slag is continuously manufactured.

FIG. 2 is a schematic sectional view illustrating an embodiment of the apparatus for manufacturing the rapidly cooled solidified slag according to the present invention. As shown in FIG. 2, in a housing 1, a cooling drum 2 is arranged so that the direction of the center axis thereof is horizontal. The cooling drum 2 is rotated by a driving means (not shown) in the direction of the arrow "a" shown in FIG. 2. A plurality of cooling through-holes (not shown) are pierced in the peripheral wall of the cooling drum 2 in the direction of the center axis thereof. One end of each of the plurality of cooling through-holes communicates with the interior of a hollow portion (not shown) of one end of the center axle of the cooling drum, and the other end of the cooling through-holes communicates with the interior of a hollow portion (not shown) of the other end of the center axle of the cooling drum. The hollow portion (not shown) of the one end of the center axle of the cooling drum 2 is liquid-tightly connected to one end of a pipe 3 through a swivel joint (not shown). The other end of the pipe 3 is connected to the inlet of a steam drum 4. An end of another pipe 6 provided with a pump 5 on the way is connected to the hot water outlet of the steam drum 4. In FIG. 2, 4a is an air feed valve of the steam drum 4, and 4b is a water supply valve of the steam drum 4. The other end of the pipe 6 is liquid-tightly connected to the hollow portion (not shown) of the other end of the center axle of the cooling drum 2 through another swivel joint (not shown). As a result, by means of the pump 5, the cooling water for cooling the cooling drum 2 is supplied to the plurality of cooling through-holes of the peripheral wall of the cooling drum 2 through the pipe 6 and the axle of the cooling drum 2. The cooling water supplied to the plurality of cooling through-holes is heated by the heat contained in the molten slag 7 deposited onto the peripheral surface of the cooling drum 2 as described later and supplied to the steam drum 4 through the axle of the cooling drum 2 and the pipe 3 while partially generating steam. The cooling water circulates through the cooling drum 2 and the steam drum 4 by means of the pump 5.

As shown in FIG. 2, in substantially the upper half of the cooling drum 2, a slag sump 9 is formed by: a slag receptacle 12 provided so as to be in contact with the cooling drum 2, and the drum body of the cooling drum at the rising position of the peripheral surface of the cooling drum 2. The slag receptacle 12 comprises a plate 12a, another plate 12b and a pair of plates 12c. The plate 12a has the longitudinal direction thereof parallel to the direction of the center axis of the cooling drum 2, with substantially the same length as the cooling drum 2, and is upright. The plate 12b has the longitudinal direction thereof parallel to the direction of the center axis of the cooling drum 2. One end of the plate 12b in the transverse direction is fitted to the lower end of the plate 12a, and the other end thereof in the transverse direction is in contact with the peripheral surface of the cooling drum 2. The plate 12b has substantially the same length as the cooling drum 2 and is horizontal. The pair of plates 12c are fitted respectively to the both longitudinal ends of the plate 12a and the plate 12b and are in contact with the both ends of the cooling drum 2. A cover 12' having an opening 12'a is fitted to the top ends of the plate 12a and the pair of plates 12c. The slag receptacle 12 and the cover 12' are supported on the housing 1 by a suitable supporting means not shown. The molten slag 7 discharged from a slag runner 10 is poured into the slag sump 9 through the opening 1a of the housing 1 and the opening 12'a of the cover 12', where a slag pool is formed. The molten slag 7 poured into the slag sump 9 is deposited onto the peripheral surface of the cooling drum 2 during the rotation thereof, rapidly cooled and solidified into a solidified slag. The cooling water supplied to the plurality of cooling through-holes of the peripheral wall of the cooling drum 2 is heated by the molten slag 7 deposited onto the peripheral surface of the cooling drum 2 into a hot water having a pressurized steam. When the rapidly cooled solidified slag 7' reaches the lower half of the cooling drum 2 according to the roation of the cooling drum 2, the rapidly cooled solidified slag 7' deposited onto the peripheral surface of the cooling drum 2 is peeled off therefrom while being crushed by a scraper 11 supported on the housing 1, and drops into the lower part of the housing 1. A suitable opening and closing means (not shown) is provided at the discharge port 1b in the lower part of the housing 1. The peripheral surface of the cooling drum from which the rapidly cooled solidified slag 7' has been peeled off by the scraper 11 comes again into contact with the molten slag 7 of the slag sump 9 according to the rotation of the cooling drums 2, whereby the rapidly cooled solidified slag is continuously manufactured.

According to the above-mentioned manufacturing apparatus of the rapidly cooled solidified slag, having a pair of rotating cooling drums 2 and the above-mentioned manufacturing apparatus of the rapidly cooled solidified slag, having a rotating cooling drum 2, it is possible to continuously manufacture the rapidly cooled solidified slag. However, any of the above-mentioned manufacturing apparatus has the following problems. It has been difficult to stably deposit a molten slag 7 onto the peripheral surface of the cooling drum and ensure peel off of the rapidly cooled solidified slag 7' obtained by rapid cooling and solidification of the molten slag 7 on the peripheral surface of the cooling drum 2 from the peripheral surface of the cooling drum 2. A low adhesion of molten slag 7 to the cooling drum 2, for example, leads to a lower cooling efficiency of the molten slag 7 on the peripheral surface of the cooling drum 2. As a result, for example, there is a decrease in the ratio of vitrification of solidified slag obtained by rapidly cooling and solidifying a molten blast furnace slag by the cooling drum 2. When the molten slag 7 has a low adhesion relative to the cooling drum 2, the molten slag 7 of the slag sump 9 is not deposited onto the peripheral surface of the cooling drum 2 during the rotation thereof, thus making it impossible to manufacture a solidified slag. For example, on the other hand, when adhesion of the molten slag 7 to the peripheral surface of the cooling drum 2 is strong, the peel off property of the rapidly cooled solidified slag from the peripheral surface of the cooling drum 2 is impaired, leading to a serious wear of the peripheral surface of the cooling drum 2 and the scraper 11. Particularly, in the case of the pair of cooling drums 2, solidified slag firmly adhering to the contact portion of the two cooling drums, thus causing more serious wear of the peripheral surface of the cooling drum 2 and the scraper 11.

SUMMARY OF THE INVENTION

An object of the present invention is therefore to provide an apparatus for manufacturing a rapidly cooled solidified slag, which permits stable and continuous manufacture of the rapidly cooled solidified slag and has at least one rotating cooling drum.

A principal object of the present invention is to provide an apparatus for manufacturing a rapidly cooled solidified slag, which is excellent in adhesion of molten slag to the peripheral surface of the cooling drum and in peel off property of the rapidly cooled solidified slag from the peripheral surface of the cooling drum, and has at least one rotating cooling drum.

In accordance with one of the features of the present invention, there is provided an apparatus for manufacturing a rapidly cooled solidified slag, which comprises:

at least one rotating cooling drum, said cooling drum having a horizontal center axis and being cooled by cooling medium;

a driving means for rotating said cooling drum, said driving means being adapted to rotate said cooling drum around said center axis thereof;

a slag sump, provided at the rising position of said peripheral surface of said cooling drum, for depositing a molten slag onto said peripheral surface of said cooling drum, part of said slag sump comprising part of said peripheral surface of said cooling drum;

a scraper provided so as to be in contact with the lower half of said peripheral surface of said cooling drum; and, a slag feeding means, arranged above said cooling drum, for pouring said molten slag into said slag sump;

whereby said molten slag poured into said slag sump is deposited onto said peripheral surface of said cooling drum, rapidly cooled through heat exchange with said cooling medium according to the rotation of said cooling drum to become a solidified slag, and peeled off from said peripheral surface of said cooling drum by said scraper;

said apparatus characterized in that:

said peripheral surface of said cooling drum comprises a plurality of jogs over the entire surface thereof.

DETAILED DESCRIPTION OF PREFERRED EMBODIMENTS

Figure 1:
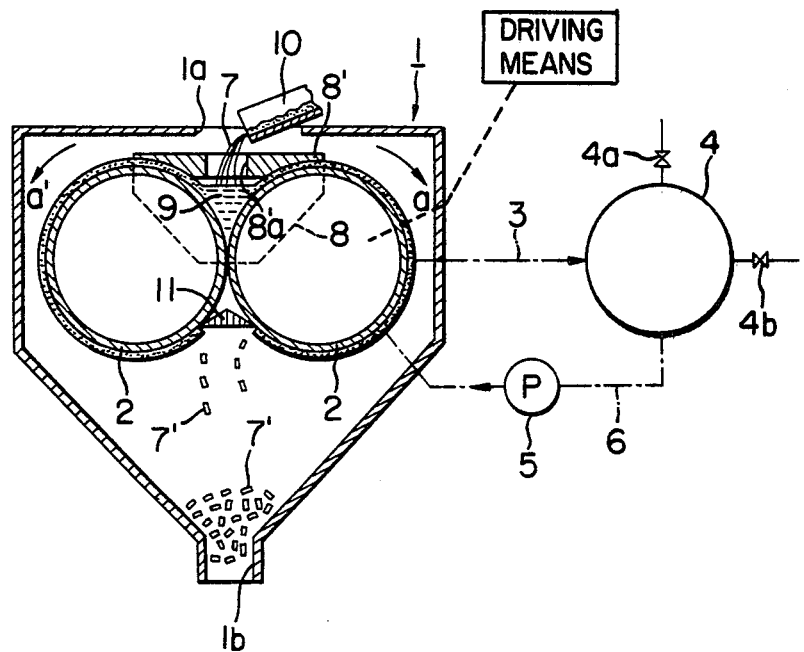
FIG. 1 is a schematic sectional view showing a prior art apparatus of for manufacturing a rapidly cooled solidified slag, having a pair of rotating cooling drums.
Figure 2:
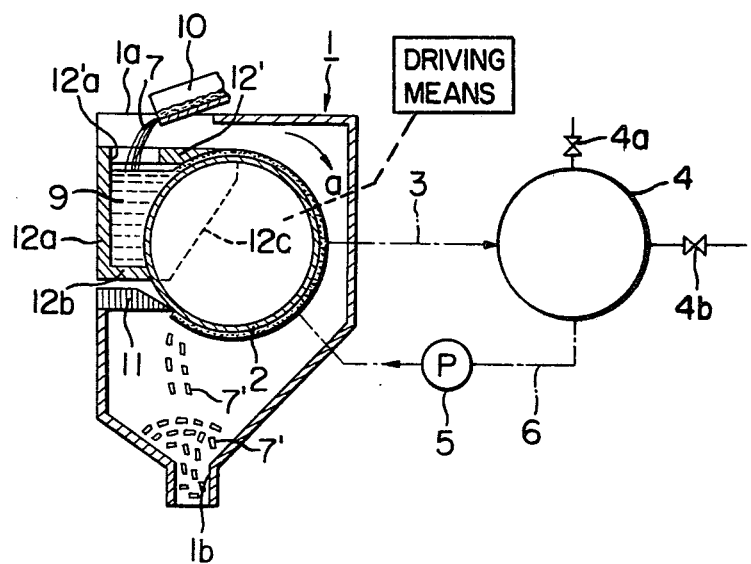
FIG. 2 is a schematic sectional view showing an embodiment of apparatus for manufacturing a rapidly cooled solidified slag, having a rotating cooling drum, constructed in accordance with the present invention.

With a view to solving the above-mentioned problems we carried out extensive studies. More specifically, we first studied the dependences of the adhesion property of a molten slag to the peripheral surface of the cooling drum and the peel off property of a rapidly cooled solidified slag from the peripheral surface of the cooling drum as to the chemical composition and temperature of the molten slag; the material, surface temperature and surface properties of the cooling drum; and, the contact time between the molten slag and the peripheral surface of the cooling drum. As a result, we found that it is possible to achieve an apparatus for manufacturing a rapidly cooled solidified slag, having at least one rotating cooling drum, excellent in the adhesion property of the molten slag and the peel off property of the rapidly cooled solidified slag, by forming a plurality of jogs over the entire peripheral surface of the cooling drum.

The peripheral surface of the cooling drum of the present invention has the following features:

(1) The peripheral surface of the cooling drum has a surface roughness as expressed by the "maximum height" within the range of from 12 to 500 $\mu$m over the entire surface thereof:

The above-mentioned "maximum height" is one of the expressing methods of the surface roughness, and is set forth in the Japanese Industrial Standard JIS B 0601 (revised in 1976). This "maximum height" is calculated as follows: taking a portion corresponding to the reference length from the sectional curve representing the profile of a surface to be measured; setting up the average line of said curve in said portion thus taken (average line: a straight line or a curve having the denominated shape of the surface to be measured, which is set up so that the total square of the deviation of the above average line from the sectional curve may be minimum); selecting, from among the straight lines in parallel with the average line, the straight line passing through the peak of said curve within said portion and the straight line passing through the lowest point of said curve within said portion; measuring the distance between said two straight lines in the direction of longitudinal magnification of said curve; and expressing the result of this measurement by the micrometer ($\mu$m) unit. This is the above "maximum height".

The surface roughness as expressed by the "maximum height" is limited within the range of from 12 to 500 $\mu$m for the following reasons. It is difficult to process the peripheral surface of the cooling drum so as to give a surface roughness, as expressed by a "maximum height", of over 500 $\mu$m over the entire surface, thereof, and in a cooling drum having a surface roughness, as expressed by a "maximum height", of over 500 $\mu$m, the molten slag sticks strongly to the peripheral surface thereof, thus resulting in a poor peel off property of the rapidly cooled solidified slag. In a cooling drum having a surface roughness, as expressed by a "maximum height", of under 12 $\mu$m, on the other hand, the peripheral surface becomes too smooth, thus resulting in a poor adhesion property of the molten slag. The surface roughness, as expressed by a "maximum height", of the peripheral surface of the cooling drum should therefore be within the range of from 12 to 500 μm.

Figures 3A, 3B, 3C:
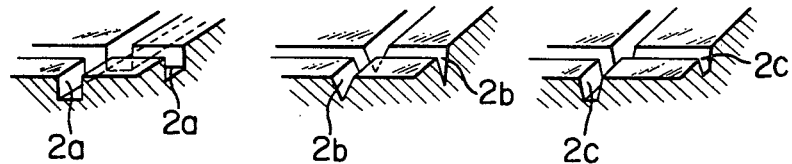
FIG. 3(a) is a perspective view showing an embodiment of part of the peripheral surface of the cooling drum, which is a component of the manufacturing apparatus of a rapidly cooled solidified slag of the present invention.
FIG. 3(b) is a perspective view showing another embodiment of part of the peripheral surface of the cooling drum, which is a component of the manufacturing apparatus of the present invention.
FIG. 3(c) is a perspective view showing another embodiment of part of the peripheral surface of the cooling drum, which is a component of the manufacturing apparatus of the present invention.

(2) The entire peripheral surface of the cooling drum has at least one of a plurality of grooves, a plurality of projections and a plurality of recesses:

Examples of a plurality of grooves are shown in the perspective views of FIGS. 3(a), 3(b) and 3(c). FIG. 3(a) shows grooves 2a having a rectangular cross sectional shape; FIG. 3(b) shows grooves 2b having a triangular cross sectional shape; and FIG. 3(c) shows grooves 2c having a trapezoidal cross sectional shape.

Figures 4A, 4B, 4C:
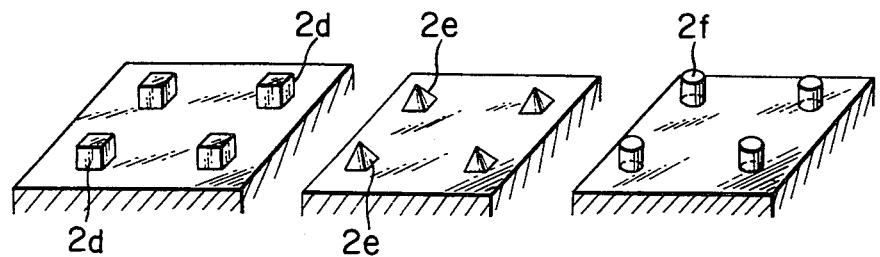
FIG. 4(a) is a perspective view showing still another embodiment of part of the peripheral surface of the cooling drum, which is a component of the manufacturing apparatus of the present invention.
FIG. 4(b) is a perspective view showing further another embodiment of part of the peripheral surface of the cooling drum, which is a component of the manufacturing apparatus of the present invention.
FIG. 4(c) is a perspective view showing further another embodiment of part of the peripheral surface of the cooling drum, which is a component of the manufacturing apparatus of the present invention.

Examples of a plurality of projections are shown in the perspective views of FIGS. 4(a), 4(b) and 4(c). FIG. 4(a) shows projections 2d having the form of rectangular columns; FIG. 4(b) shows projections 2e having the form of rectangular pyramid; and, FIG. 4(c) shows projections 2f having the form of circular columns.

Figures 5A, 5B, 5C:
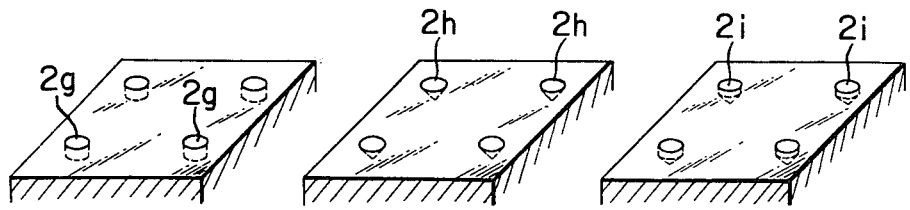
FIG. 5(a) is a perspective view showing further another embodiment of part of the peripheral surface of the cooling drum, which is a component of the manufacturing apparatus of the present invention.
FIG. 5(b) is a perspective view showing further another embodiment of part of the peripheral surface of the cooling drum, which is a component of the manufacturing apparatus of the present invention; and, FIG. 5(c) is a perspective view showing further another embodiment of part of the peripheral surface of the cooling drum, which is a component of the manufacturing apparatus of the present invention.

Examples of a plurality of recesses are shown in the perspective views of FIGS. 5(a), 6(b) and 5(c). FIG. 5(a) shows cylindrical recesses 2g; FIG. 5(b) shows conical recesses 2h; and, FIG. 5(c) shows recesses 2i each having the form of circular column provided with a conical bottom.

(3) The entire peripheral surface of the cooling drum has at least one of a plurality of grooves, a plurality of projections and a plurality of recesses, and the portions of the peripheral surface excluding the grooves, projections and recesses have a surface roughness, as expressed by a "maximum height", within the range of from 12 to 500 μm:

The grooves, projections and recesses are the same as described in (2) above, and the definition of the surface roughness and the reasons of limitation of values thereof are the same as described in (1) above.

EXAMPLE

An apparatus for manufacturing a rapidly cooled solidified slag, having the construction as described with reference to FIG. 1 was prepared. As a pair of cooling drums 2, drums made of copper or steel and having a diameter of 400 mm were prepared in a necessary number. The peripheral surface of the pair of cooling drums thus prepared were processed to satisfy the following conditions to prepare cooling drums each forming one of the components of the manufacturing apparatus of a rapidly cooled solidified slag of the present invention (hereinafter referred to as the "drums of the present invention") and the cooling drums for comparison (hereinafter referred to as the "reference drums"). In the pair of cooling drums, each drum has the peripheral surface of the same condition with each other.

(1) The drums 1, 2, 3, 4, 5, 12 and 13 of the present invention and the reference drums 1 and 2: the entire peripheral surface thereof was processed so as to give a surface roughness as shown in Table 1.

(2) The drums 6, 7, 11, 14, 15 and 16 of the present invention: a plurality of axial and circumferential grooves 2a having a cross sectional shape as shown in FIG. 3(a) with a width of 1.0 mm and a depth of 0.5 mm were formed on the peripheral surface respectively at a pitch of 10 mm, and the remaining portions of the peripheral surface excluding the grooves 2a were processed to have a surface roughness as shown in Table 1.

(3) The drum 8 of the present invention: a plurality of circumferential grooves 2b having a cross sectional shape as shown in FIG. 3(b) with a width of 1.0 mm and a depth of 0.5 mm were formed on the peripheral surface at a pitch of 10 mm, and the remaining portions of the peripheral surface excluding the grooves 2b were processed to have a surface roughness as shown in Table 1.

(4) The drum 9 of the present invention: a plurality of axial and circumferencial projections 2f having a shape as shown in FIG. 4(c) with a diameter of 1.0 mm and a height of 1.0 mm were formed on the peripheral surface respectively at a pitch of 10 mm, and the remaining portions of the peripheral surface excluding the projections 2f were processed to have a surface roughness as shown in Table 1.

(5) The drum 10 of the present invention: a plurality of axial and circumferential recesses 2i having a shape as shown in FIG. 5(c) with a diameter of the circular column portion of 2.0 mm and a depth of 1.0 mm were formed respectively at a pitch of 5 mm, and the remaining portions of the peripheral surface excluding the recesses 2i were processed to have a surface roughness as shown in Table 1.

As the pair of cooling drums 2 in the manufacturing apparatus of a rapidly cooled solidified slag, having the construction as described with reference to FIG. 1, the above-mentioned drums 1 to 16 of the present invention and reference drums 1 and 2 were employed: each drum was rotated at revolutions as shown in Table 1, and a molten blast furnace slag having a temperature within the range of from 1350° to 1500° C. was poured into the slag sump 9 in the manufacturing apparatus of a rapidly cooled solidified slag, in which the cooling drums 2 are thus in rotation. The adhesion property of the molten blast furnace slag and the peel off property of the resultant rapidly cooled solidified slag relative to the peripheral surface of the cooling drums, obtained as a result, were investigated and are arranged in Table 1. In Table 1, in the column of the adhesion property:

X: not adhering,
○: adhering,
◎: excellent adhesion,

TABLE 1

| | No. | Surface roughness (μm) | Adhesion property | Peel off property | Revolutions (r.p.m.) | Drum material |
|---|---|---|---|---|---|---|
| Reference drum | 1 | 8 to 10 | x | — | 5 | Copper |
| Drum of the present invention | 1 | 12 to 16 | ○ | ◎ | 15 | |
| | 2 | 18 to 24 | ○ | ◎ | 15 | |
| | 3 | 42 to 56 | ○ | ◎ | 10 | |
| | 4 | 125 to 168 | ◎ | ○ & ◎ | 10 | |
| | 5 | 415 to 500 | ◎ | ○ | 5 | |
| | 6 | 8 to 10 | ○ | ◎ | 15 | |
| | 7 | 42 to 56 | ◎ | ○ | 5 | |
| | 8 | 42 to 56 | ○ & ◎ | ◎ | 5 | |
| | 9 | 42 to 56 | ○ & ◎ | ◎ ○ & ◎ | 5 | |
| | 10 | 42 to 56 | ○ & ◎ | ◎ | 5 | |
| | 11 | 415 to 500 | ◎ | ○ | 10 | |
| Reference drum | 2 | 8 to 10 | x | — | 5 | Steel |
| Drum of the present invention | 12 | 290 to 392 | ○ | ◎ | 10 | |
| | 13 | 415 to 500 | ○ & ◎ | ○ | 5 | |
| | 14 | 8 to 10 | ○ | ◎ | 5 | |
| | 15 | 42 to 56 | ○ | ◎ | 5 | |
| | 16 | 125 to 168 | ○ | ○ | 15 | | and in the column of the peel off property:
○: slag was smoothly peeled off by the scraper 11, ◎: slag dropped spontaneously by its weight under the effect of gravity at the lower part of the cooling drums 2.

In a manufacturing apparatus of a rapidly cooled solidified slag, using any one of the drums 1 to 16 of the present invention, both the adhesion property of the molten blast furnace slag and the peel off property of the rapidly cooled solidified slag relative to the peripheral surface of the cooling drums were apparently excellent as shown in Table 1, and it was possible to stably manufacture a rapidly cooled solidified slag with a high ratio of vitrification.

Operations similar to those mentioned above were carried out with the use of cooling drums having a diameter of 2,000 mm prepared to satisfy the conditions of the present invention, and gave results almost identical with those in the above-mentioned Example. in the same apparatus as that in the above-mentioned Example, a rapidly cooled solidified slag could be stably manufactured from a molten converter slag.

According to the present invention, as described above, there is provided an apparatus for manufacturing a rapidly cooled solidified slag, having at least one rotating cooling drum, excellent in the adhesion property of a molten slag and the peel off property of the resultant rapidly cooled solidified slag relative to the peripheral surface of the cooling drum, which permits stable manufacture of the rapidly cooled solidified slag, thus providing industrially useful effects.

What is claimed is:

1. An apparatus for manufacturing a rapidly cooled solidified slag, which comprises:
    at least one rotating cooling drum having a peripheral surface, said cooling drum having a horizontal center axis and being cooled by a cooling medium;
    driving means for rotating said cooling drum around said horizontal center axis thereof;
    means defining a slag sump at the rising position of said peripheral surface of said cooling drum, and including means for depositing molten slag onto said peripheral surface of said cooling drum, part of said means defining said slag sump comprising part of said peripheral surface of said cooling drum;
    a scraper provided so as to be in contact with the lower half of said peripheral surface of said cooling drum for peeling off solidified slag from said cooling drum; and,
    a slag feeding means, arranged above said cooling drum, for pouring said molten slag into said slag sump; whereby said molten slag poured into said slag sump is deposited onto said peripheral surface of said cooling drum, rapidly cooled through heat exchange with said cooling medium according to the rotation of said cooling drum to become a solidified slag, and peeled off from said peripheral surface of said cooling drum by said scraper; and
    said peripheral surface of said cooling drum comprises means defining surface irregularities over substantially the entire surface of said peripheral surface, said surface irregularities including at least one of a plurality of grooves formed in said peripheral surface, a plurality of projections on said peripheral surface, a plurality of recesses in said peripheral surface and a surface roughness of said peripheral surface expressed by a maximum height within the range of from 12 to 500 $\mu$m.

2. The apparatus as claimed in claim 1, wherein:
    said peripheral surface of said cooling drum comprises at least one of a plurality of grooves, a plurality of projections and a plurality of recesses formed therein, and the remaining portions of said peripheral surface excluding said grooves, said projections and/or said recesses have a surface roughness as expressed by a maximum height within the range of from 12 to 500 $\mu$m.

3. The apparatus as claimed in claim 1, wherein said means defining surface irregularities on said peripheral surface of said cooling drum comprises a plurality of grooves formed in said peripheral surface over substantially the entire surface thereof.

4. The apparatus as claimed in claim 3, wherein said grooves comprise intersecting grooves formed in said peripheral surface.

5. The apparatus as claimed in claim 1, wherein said means defining surface irregularities on said peripheral surface comprises a plurality of spaced-apart projections extending from said peripheral surface over substantially the entire surface thereof.

6. The apparatus as claimed in claim 1, wherein said means defining surface irregularities on said peripheral surface comprises a plurality of spaced-apart recesses distribued over said peripheral surface over substantially the entire surface thereof.

7. The apparatus as claimed in any one of claims 3, 4, 5, or 6, wherein the remaining portions of said peripheral surface excluding said grooves, said projections and/or said recesses have a surface roughness as expressed by a maximum height within the range of from 12 to 500 $\mu$m.

* * * * *